(12) United States Patent
Baehr

(10) Patent No.: US 8,788,168 B2
(45) Date of Patent: Jul. 22, 2014

(54) METHOD FOR CONTROLLING A DUAL CLUTCH

(71) Applicant: Schaeffler Technologies AG & Co. KG, Herzogenaurach (DE)

(72) Inventor: Markus Baehr, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 41 days.

(21) Appl. No.: 13/633,416

(22) Filed: Oct. 2, 2012

(65) Prior Publication Data

US 2013/0025996 A1 Jan. 31, 2013

Related U.S. Application Data

(63) Continuation of application No. PCT/EP2011/001470, filed on Mar. 24, 2011.

(30) Foreign Application Priority Data

Apr. 8, 2010 (DE) .......................... 10 2010 014 198

(51) Int. Cl.
*G06F 7/00* (2006.01)

(52) U.S. Cl.
USPC .................. 701/67; 477/175; 192/48.601

(58) Field of Classification Search
USPC .............. 701/68, 67; 477/175, 116; 192/3.58, 192/85.55, 85.51, 70.252, 48.601
See application file for complete search history.

(56) References Cited

U.S. PATENT DOCUMENTS

| 4,798,272 | A | * | 1/1989 | Murata et al. ............. 192/70.252 |
| 6,056,659 | A | * | 5/2000 | McCarthy et al. ............. 475/116 |
| 6,116,391 | A | * | 9/2000 | Kremmling et al. ......... 192/3.58 |
| 7,059,128 | B2 | * | 6/2006 | Rammhofer .................... 60/588 |
| 7,231,287 | B2 | * | 6/2007 | Baehr ............................ 701/67 |
| 7,350,634 | B2 | * | 4/2008 | Baehr et al. ................ 192/85.51 |
| 8,172,059 | B2 | * | 5/2012 | Reuschel et al. ........... 192/85.55 |
| 8,272,994 | B2 | * | 9/2012 | Nedachi et al. ................ 477/175 |
| 2004/0188218 | A1 | * | 9/2004 | Berger et al. .................... 192/90 |
| 2006/0132069 | A1 | * | 6/2006 | Hemphill et al. ................. 318/9 |
| 2009/0247362 | A1 |   | 10/2009 | Nedachi et al. |
| 2011/0054754 | A1 | * | 3/2011 | Zimmermann et al. ........ 701/68 |

FOREIGN PATENT DOCUMENTS

| DE | 102005023538 | | 1/2006 |
| DE | 102008019949 | | 10/2008 |
| DE | 102008031954 | | 1/2009 |
| DE | 102008031954 | A1 * | 1/2009 |

(Continued)

*Primary Examiner* — Helal A Algahaim
*Assistant Examiner* — Shardul Patel
(74) *Attorney, Agent, or Firm* — Simpson & Simpson, PLLC

(57) ABSTRACT

The invention relates to a method for controlling a dual clutch and a dual clutch housing two friction clutches which are each actuated independently of one another by means of a hydrostatic actuator. The hydrostatic actuator actuates the clutch as a function of a control signal of a control unit by means of a pressure which is applied to the actuation element and corresponds to a position of an actuation element of the friction clutch along an activation path. In order to sense a change in the position of the actuation element on one friction clutch which is brought about by the pressure on the actuation element of the other friction clutch, it is proposed to determine a correction variation for the purpose of compensating the changed position by means of a variable which represents the pressure of the disruptive hydrostatic actuator.

12 Claims, 1 Drawing Sheet

(56) References Cited

FOREIGN PATENT DOCUMENTS

| EP | 1524446 | 4/2005 |
| EP | 1524446 A1 * | 4/2005 |
| WO | 2004/036078 | 4/2004 |

* cited by examiner

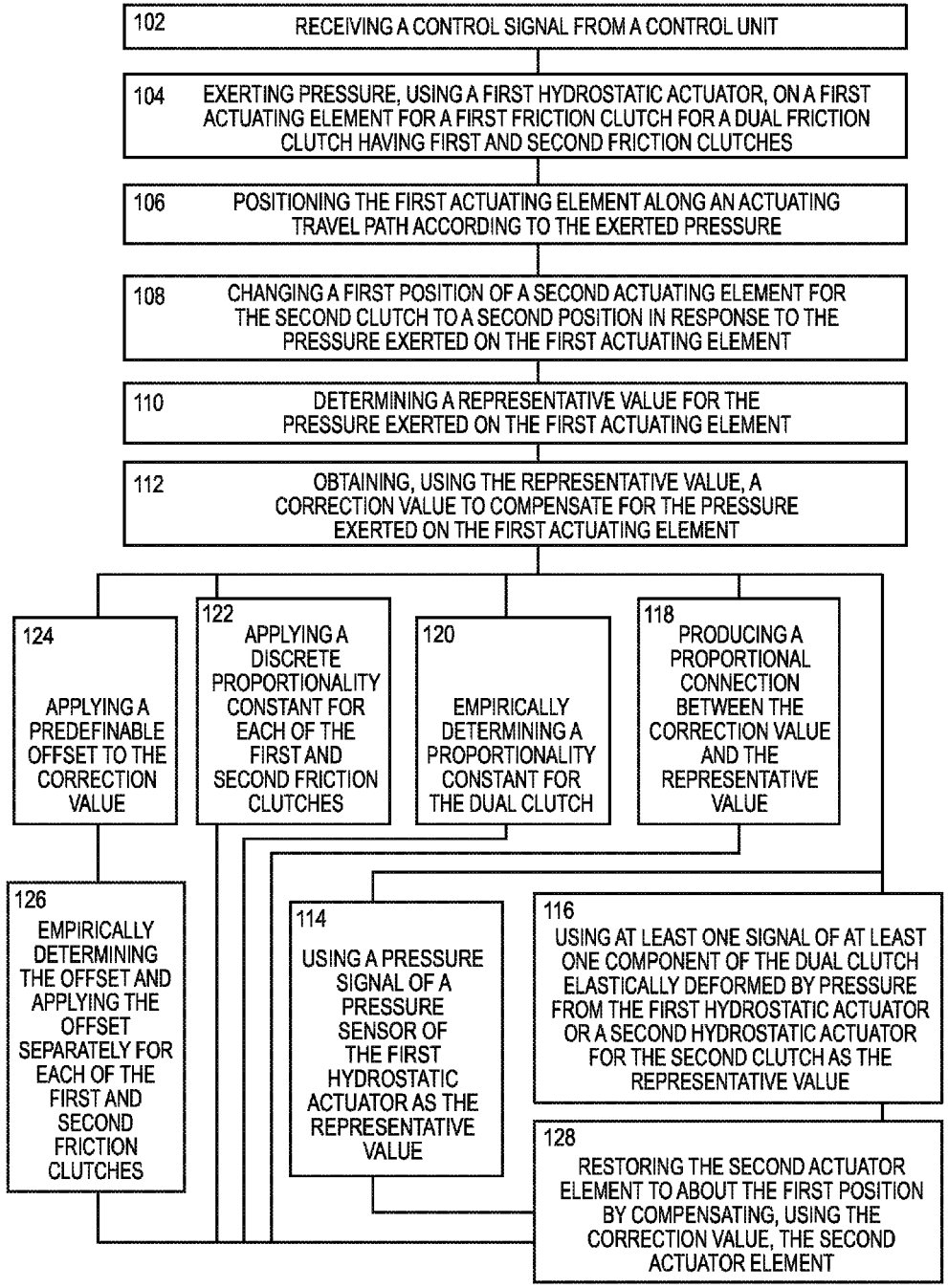

US 8,788,168 B2

METHOD FOR CONTROLLING A DUAL CLUTCH

CROSS-REFERENCE TO RELATED APPLICATIONS

This application is filed under 35 U.S.C. §120 and §365(c) as a continuation of International Patent Application PCT/EP2011/001470, filed Mar. 24, 2011, which application claims priority from German Patent Application No. 10 2010 014 198.4, filed Apr. 8, 2010, which applications are incorporated herein by reference in their entireties.

FIELD OF THE INVENTION

The invention relates to a method for controlling a dual clutch, and a dual clutch having two friction clutches actuated independently of each other by means of one hydrostatic actuator in each case.

BACKGROUND OF THE INVENTION

Dual clutches having two friction clutches situated in one housing are known, for example, from German Patent Application No. 10 2008 019 949 A1. Here, the friction clutches are each actuated by a hydrostatic actuator, which exerts a pressure on an actuating element in the form of a lever spring, which in turn tensions a pressing plate against the pressure plate directly or by means of a tie rod, depending on the arrangement of the friction clutch, while interposing friction linings of a clutch plate. A directly actuated dual clutch is known from European Patent No. 1 524 446 B1, where the pressing plates are actuated by actuating elements, which are situated directly between the hydrostatic actuator and the pressing plates without interposing a lever spring.

Depending on the pressure applied to the actuating element by the hydrostatic actuator, the actuating element moves along an actuation path and sets a corresponding moment of friction depending on its position along the actuation path. Because of the elasticities of the materials of the dual clutch, which are present in practice, actuation of the one friction clutch influences the position of the disengaging element of the other friction clutch, so that when pressure is present a modified torque is transmitted via the disrupted friction clutch, which can result in a reinforcement or weakening of the torque desired by prescribing the pressure, depending on the arrangements of the friction clutches in the dual clutch.

A method for modeling of and compensation for such over-addressing processes is known from International Patent Application No. 2004/036078 A1. In this case, the characteristic curves of the friction clutches, from which the torque transmissible via the friction clutches is derived, depending on the position along the actuation travel path, are cited. These characteristic curves contain, among other things, the coefficient of friction of the friction clutch, as a proportionality value. A nominal clutch torque corrected for the coefficient of friction is therefore obtained, and from it is obtained the shift of the characteristic curve in the event of crosstalk when the other friction clutch is actuated. This method is complex and comparatively imprecise, due, for example, to changing coefficients of friction of the friction clutches between two adaptation processes of the coefficient of friction.

BRIEF SUMMARY OF THE INVENTION

The object of the invention is the advantageous refinement of a method for controlling a dual clutch, and of a dual clutch, preferably for the improved assessment of and compensation for an influencing of the two friction clutches while they are being actuated.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1 is a flow chart illustrating a method of controlling a dual clutch.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The object is fulfilled by a method for controlling a dual clutch having two friction clutches that are actuated independently of each other by means of one hydrostatic actuator each, which exerts a pressure on the actuating element corresponding to a position of an actuating element of the friction clutch along an actuating travel path, depending on a control signal of a control unit. If, in this case, the pressure on an actuating element of one friction clutch changes the position of the actuating element on the other friction clutch, according to the inventive idea a correction value to compensate for the changed position is obtained by means of a value representing the position of the disrupting hydrostatic actuator. By obtaining the correction value directly from the pressure that adjusts the position of the actuating element, a direct connection is established between the disruption value and the influence on the disrupted friction clutch, so that an exact and high-quality assessment of the disruption can be provided.

In this case, the obtained correction value can be subjected to an evaluation prior to consideration when actuating the disrupted friction clutch, where in the case of correspondingly small disruptions and as a result of small correction values a compensation can be dispensed with, and only when a threshold is exceeded is the algorithm of the actuation of the friction clutch changed so that the correction value brings about a compensation for the disruption by actuating the other friction clutch. In other embodiments, this compensation can be considered even with small correction values in the controlling of the hydrostatic actuator. A normal control routine of the control unit can be provided in this case such that a desired torque to be transmitted via the friction clutch is converted on the basis of a characteristic curve or a characteristic map into a position along the actuation travel path, and a pressure is produced by means of an electric motor in the hydrostatic actuator, which results in the setting of the position. If the position of the actuating element, and thus the torque transmissible via the friction clutch, is disrupted by the simultaneous actuation of the other friction clutch, the pressure changes in that case due to the changing position of the disrupted friction clutch. Due to the consideration of the correction value, the position of the actuating element of the disrupted friction clutch is corrected again to the original, undisrupted position, by correcting the control variable for the hydrostatic actuator by means of the correction value.

The representative value for the pressure can be determined in various ways. For example, the differential position of the disrupted actuating element can be detected by means of a distance sensor. Alternatively or in addition, the representative value can be determined as at least one signal of at least one component of the dual clutch that is elastically deformed by the pressure of the hydrostatic actuators. It is preferable to use a pressure signal of a pressure sensor present in the hydrostatic actuator as the representative value, since a signal that is directly present for the pressure and directly interpretable is available without the requirement of additional components and connecting lines.

The mutual influence of the two friction clutches during their operation can result in a reinforced or weakened frictional torque, independent of their geometric arrangement and dependent on the design of the components of the friction clutch, so that the correction value appears, for example, as a characteristic map, in which the correction values of the two friction clutches are stored, independent of the actuating state of the two friction clutches. In the case of dual clutches having hydrostatic actuators operating in the same direction, in which the pressing plates are moved by means of the actuating element in the same direction toward the same or different counterpressure plates so as to build up a frictional torque, for example, directly actuated dual clutches with non-stepped transmission of a contact pressure from the hydrostatic actuator to the pressing plate, influences of the friction torque of one friction clutch by the other can only be expected in the form of a weakening of the frictional torque in the event of disruption by the other frictional clutch. For example, in the case of such embodiments, a simple, proportional connection can be produced between the correction value and the representative value. In this case, the same proportionality constant can be obtained empirically for both friction clutches, or a proportionality constant can be obtained empirically discretely for each friction clutch. Preferably, the correction value has a prescribable offset applied, which again can be obtained empirically for each individual friction clutch discretely for both friction clutches jointly. It goes without saying that the proportionality constants and/or offsets can be obtained in a preferable manner on a test stand and/or on the basis of calculations, for example, on the basis of calculations according to the finite element method or other approximation procedures.

For the determination of the correction values $\Delta x_1$ and $\Delta x_2$ of the two friction clutches, the following relationships are found depending on the pressure signals $p_1$, $p_2$ detected by means of the pressure sensors situated in the two hydrostatic actuators:

$$\Delta x_1 = C_1 + A_1 * p_2$$

and $$\Delta x_2 = C_2 + A_2 * p_1$$

In this case, the correction value of the disrupted friction clutch is obtained in each case from the pressure signal of the pressure sensor of the hydrostatic actuator acting upon the disrupting friction clutch. The offsets $C_1$, $C_2$ for the corresponding friction clutch are determined for a minimum pressure to be applied, if the hydrostatic actuator of the other friction clutch is in the non-pressurized state. The proportionality constants $A_1$, $A_2$ are obtained, for example, empirically on a test stand of the friction clutch together with hydrostatic actuators. The positions of the characteristic curves assigned to the friction clutches are corrected in a preferred manner by means of the connections listed above. For example, a characteristic curve of the torque transmitted via the friction clutch is moved above its position $x_1$ or $x_2$ set by the hydrostatic actuator in the event of a disruption due to the activation of the other friction clutch by correcting the position $x_1$ or $x_2$ by adding the correction value $\Delta x_1$ or $\Delta x_2$.

The invention is also fulfilled by a dual clutch having two friction clutches, each actuated by a hydrostatic actuator with a pressure sensor, to carry out the described method according to the invention. In this case, the pressure sensor of each of the hydrostatic actuators of the disrupting friction clutch supplies the representative value to determine the correction value of the disrupted friction clutch.

FIG. 1 is a flow chart illustrating a method of controlling a dual clutch. Although the method in FIG. 1 is depicted as a sequence of numbered steps for clarity, no order should be inferred from the numbering unless explicitly stated. The method starts at Step 102. Step receives a control signal from a control unit. Step 104 exerts pressure, using a first hydrostatic actuator, on a first actuating element for a first friction clutch for a dual friction clutch having first and second friction clutches. Step 106 positions the first actuating element along an actuating travel path according to the exerted pressure. Step 108 changes a first position of a second actuating element for the second clutch to a second position in response to the pressure exerted on the first actuating element. Step 110 determines a representative value for the pressure exerted on the first actuating element. Obtaining, using the representative value, a correction value to compensate for the pressure exerted on the first actuating element. In an example embodiment, step 114 uses a pressure signal of a pressure sensor of the first hydrostatic actuator as the representative value. In an example embodiment, step 116 uses at least one signal of at least one component of the dual clutch elastically deformed by pressure from the first hydrostatic actuator or a second hydrostatic actuator for the second clutch as the representative value. In an example embodiment, step 118 produces a proportional connection between the correction value and the representative value. In an example embodiment, step 120 empirically determines a proportionality constant for the dual clutch. In an example embodiment, step 122 applies a discrete proportionality constant for each of the first and second friction clutches. In an example embodiment, step 124 applies a predefinable offset to the correction value. In an example embodiment, step 126 empirically determines the offset and applying the offset separately for each of the first and second friction clutches. Step 128 restores the second actuator element to about the first position by compensating, using the correction value, the second actuator element.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limit-

What I claim is:

1. A method for controlling a friction clutch having two friction clutches that can be actuated by one hydrostatic actuator each, comprising:
    depending on a control signal of a control unit, exerting a pressure on the actuating element corresponding to a position of an actuating element of the friction clutch along an actuating travel path;
    changing the pressure on an actuating element of one friction clutch according to the position of the actuating element on the other friction clutch at least partially; and,
    obtaining, using the control unit, a correction value, representing the pressure of the disrupting hydrostatic actuator to compensate for the changed position.

2. The method as recited in claim 1, further comprising:
    compensating for, using the control unit and the correction value, the position of the disrupted actuating element in such a way that the undisrupted position is at least approximately restored again.

3. The method as recited in claim 1, wherein the representative value is a pressure signal of the pressure sensor of the disrupting hydrostatic actuator.

4. The method as recited in claim 1, wherein the representative value is at least one signal of at least one component of the dual clutch elastically deformed by the pressure of the hydrostatic actuators.

5. The method as recited in claim 1, further comprising:
    producing, using the control unit, a proportional connection between the correction value and the representative value.

6. The method as recited in claim 5, further comprising:
    determining, using the control unit, a proportionality constant empirically for the employed dual clutch.

7. The method as recited in claim 5, further comprising:
    applying, using the control unit, a discrete proportionality constant for each of the friction clutches.

8. The method as recited in claim 1, wherein the correction value has a predefinable offset applied to it.

9. The method as recited in claim 8, further comprising:
    determining, using the control unit, the offset empirically; and
    applying, using the control unit, the offset separately for each of the friction clutches.

10. A dual clutch having two friction clutches, each actuated by a hydrostatic actuator having a pressure sensor, to carry out the method as recited in claim 1.

11. A method for controlling a friction clutch including first and second friction clutches with first and second hydrostatic actuators and first and second actuating elements, respectively, comprising:
    exerting, with the first hydrostatic actuator and depending on a control signal of a control unit, a pressure on the first actuating element corresponding to a position of an the actuating element along an actuating travel path;
    changing, in response to the pressure, a position of the second actuating element from an undisrupted position to a disrupted position;
    obtaining, using the control unit, a correction value, representing the pressure, to compensate for the disrupted position of the second actuating element; and,
    restoring, using the control unit and of the correction value, the second actuator element to approximately the undisrupted position.

12. A method for controlling a friction clutch including a first friction clutch with a first hydrostatic actuator having a pressure sensor, and a first actuating element and a second friction clutch including a second hydrostatic actuator and second actuating element, respectively, comprising:
    exerting, with the first hydrostatic actuator and depending on a control signal of a control unit, a pressure on the first actuating element corresponding to a position of an the actuating element along an actuating travel path;
    changing, using the control unit and in response to the pressure, a position of the second actuating element from an undisrupted position to a disrupted position; and,
    obtaining, using the control unit and from a pressure signal of the pressure sensor, a correction value, representing the pressure, to compensate for the disrupted position.

* * * * *